(12) United States Patent
Zhao

(10) Patent No.: US 9,788,371 B2
(45) Date of Patent: Oct. 10, 2017

(54) LAMP CAP INTEGRATED WITH LED DRIVE POWER SUPPLY

(71) Applicant: Yijun Zhao, Shanghai (CN)

(72) Inventor: Yijun Zhao, Shanghai (CN)

( * ) Notice: Subject to any disclaimer, the term of this patent is extended or adjusted under 35 U.S.C. 154(b) by 0 days.

(21) Appl. No.: 14/781,565

(22) PCT Filed: Apr. 4, 2014

(86) PCT No.: PCT/CN2014/074836
§ 371 (c)(1),
(2) Date: Dec. 3, 2015

(87) PCT Pub. No.: WO2014/166367
PCT Pub. Date: Oct. 16, 2014

(65) Prior Publication Data
US 2016/0088693 A1    Mar. 24, 2016

(30) Foreign Application Priority Data

Apr. 8, 2013    (CN) .......................... 2013 1 0120047

(51) Int. Cl.
| | |
|---|---|
| *H05B 33/08* | (2006.01) |
| *F21V 23/00* | (2015.01) |
| *F21V 23/06* | (2006.01) |
| *F21K 9/23* | (2016.01) |

(Continued)

(52) U.S. Cl.
CPC ........... *H05B 33/0815* (2013.01); *F21K 9/23* (2016.08); *F21K 9/238* (2016.08); *F21V 23/006* (2013.01); *F21V 23/008* (2013.01); *F21V 23/06* (2013.01); *H05B 33/0818* (2013.01); *F21Y 2115/10* (2016.08); *Y02B 20/19* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,806,965 | A * | 9/1998 | Deese ................ | H05B 33/0803 362/237 |
| 6,870,327 | B2 * | 3/2005 | Takahashi .......... | H05B 41/2806 315/248 |
| 2014/0300274 | A1 * | 10/2014 | Acatrinei ........... | H05B 33/0815 315/85 |

FOREIGN PATENT DOCUMENTS

| | | |
|---|---|---|
| CN | 201803292 U | 4/2011 |
| CN | 102095174 A | 6/2011 |
| CN | 202082733 U | 12/2011 |

(Continued)

*Primary Examiner* — Douglas W Owens
*Assistant Examiner* — Jianzi Chen
(74) *Attorney, Agent, or Firm* — Global IP Services; Tianhua Gu

(57) ABSTRACT

The present invention generally relates to semiconductor lighting technology, and more particularly, to a lamp holder with a LED driving power supply integrated therein. The lamp holder according to one embodiment of the present invention comprises: a housing, including: a base made of insulation material; a side wall fixed with the base, at least a part of which is made of conductive material; an electrical contact member fixed at the bottom of the base; and a LED driving power supply, including: a baseplate being fixed in a space defined by the base and the side wall; a LED driving circuit arranged on the baseplate; a first input electrode and a second input electrode arranged on the baseplate and electrically connected to the side wall and the electrical contact member.

9 Claims, 9 Drawing Sheets

(51) Int. Cl.
*F21K 9/238* (2016.01)
*F21Y 115/10* (2016.01)

(56) References Cited

FOREIGN PATENT DOCUMENTS

| CN | 102652242 A | 8/2012 |
| CN | 102695343 A | 9/2012 |
| CN | 102980076 A | 3/2013 |
| CN | 202799315 U | 3/2013 |

* cited by examiner

LAMP CAP INTEGRATED WITH LED DRIVE POWER SUPPLY

TECHNICAL FIELD

The present invention generally relates to semiconductor lighting technology, and more particularly, to a lamp holder with a LED driving power supply integrated therein.

BACKGROUND

In lighting industry, light-emitting diode (LED)-based light sources are attractive in use. As a novel and green light source, LEDs have lower power consumption, long life cycle, compact structure, and are environment-friendly, and thus are used in a wide range of fields such as sign indication, displaying, decoration, light source and urban night-lighting.

A LED is a solid semiconductor device with a fundamental structure typically having a frame, a semiconductor die arranged on the frame and packaging material for encapsulating the semiconductor die, such as Silica with phosphor powder and epoxy resin. The semiconductor die comprises a P-N junction where electrons will be driven toward a p-type region to recombine with electron holes, releasing energy in the form of photons. The optical wavelength is determined by the material constituting the P-N junction.

During operation in a LED, only a portion of electrical energy is converted into optical energy and the remaining is converted into heat, increasing LED temperature, which is the main factor for deterioration and failure. Therefore, it needs an optimized thermal design for LED lighting apparatus. Meanwhile, a LED driving power supply is usually integrated into the LED lighting apparatus and become an additional heat source. This makes the thermal design more difficult. On the other hand, the heat generated from LEDs may be transported to the LED driving power supply, shortening its life cycle and making its operational state unstable.

SUMMARY

One of the objects of the present invention is to provide a lamp holder with a LED driving power supply integrated therein, which can reduce or eliminate adverse effects imposed from each other.

The above and other objects can be achieved by a lamp holder, comprising:
a housing, including:
  a base made of insulation material;
  a side wall fixed with the base, at least a part of which is made of conductive material;
  an electrical contact member fixed at the bottom of the base; and
a LED driving power supply, including:
  a baseplate being fixed in a space defined by the base and the side wall;
  a LED driving circuit arranged on the baseplate;
  a first input electrode and a second input electrode arranged on the baseplate and electrically connected to the side wall and the electrical contact member.

In the prior art lighting apparatus such as bulb lamps, a LED driving power supply is placed with a heatsink inside a lampshade. According to the above embodiment of the present invention, however, the LED driving power supply is integrated into the lamp holder. The power supply is distant from the LED light source and thus it has less heat impact from each other. Moreover, with this structure, the heatsink may be solid and thus improve heat dissipation for the lighting apparatus. Furthermore, if the heatsink is arranged on the external surface of the LED lighting apparatus, for the sake of safety, a complicated and expensive isolated power supply is required. In the embodiment of the present invention, however, the driving power supply is integrated into the lamp holder and thus the isolated power supply is unnecessary for safety specification.

Preferably, in the lamp holder as described above, the first and second input electrodes are in the form of wire.

Preferably, in the lamp holder as described above, on a side of the baseplate, a conductive area is formed to contact with the side wall so as to act as the first input electrode, and the second input electrode is in the form of wire.

Preferably, in the lamp holder as described above, a via hole is formed at the bottom of the base, and the electrical contact member is in the form of tin solder with which the via hole is filled.

Preferably, in the lamp holder as described above, a via hole is formed at the bottom of the base, and the electrical contact member includes a metal rod and a metal patch fixed at one end of the metal rod, the metal rod is embedded into the via hole.

Preferably, in the lamp holder as described above, screw thread is formed on the outer surface of the side wall.

Preferably, in the lamp holder as described above, the LED driving circuit comprises:
  an AC/DC converting unit;
  a switched-mode DC/DC converter coupled to the AC/DC converting unit.

Preferably, the switched-mode DC/DC converter comprises:
  a DC-DC boost converting unit, comprising an inductor, a switching diode, a PWM controller and a MOS transistor, wherein the inductor and the switching diode are connected in series between the AC/DC converting unit and a positive output terminal, a drain of the MOS transistor is electrically connected between the inductor and an anode of the switching diode, a gate of the MOS transistor is electrically connected to an output port of the PWM controller; and
  a feedback unit, comprising a transistor with a base terminal electrically connected to a negative output terminal and a collector terminal electrically connected to a control port of the PWM controller.

More preferably, in the lamp holder as described above, the switched-mode DC/DC converter further comprises a capacitor electrically connected between the control port of the PWM controller and an electrical grounding an AC/DC converting unit.

More preferably, in the lamp holder as described above, the PWM controller and the MOS transistor are integrated into the same IC.

More preferably, in the lamp holder as described above, the PWM controller, the MOS transistor and the transistor are integrated into the same IC.

More preferably, in the lamp holder as described above, the PWM controller and the MOS transistor are integrated into the same IC.

Preferably, the switched-mode DC/DC converter comprises:
  a DC-DC buck converting unit, comprising an inductor, a switching diode, a PWM controller and a MOS transistor, wherein a cathode of the switching diode and a positive output terminal are commonly connected to an input terminal of the AC/DC converting unit, a drain of the MOS transistor is electrically connected to an anode of the switching diode, a gate of the MOS transistor is electrically connected to an output port of the PWM controller, and the inductor is electrically connected between the drain of the MOS transistor and a negative output terminal; and a feedback unit, comprising a resistor connected to both of a source of the MOS transistor and a control port of the PWM controller.

More preferably, in the lamp holder as described above, the switched-mode DC/DC converter further comprises a capacitor electrically connected between the positive output terminal and the negative output terminal More preferably, in the lamp holder as described above, the PWM controller and the MOS transistor are integrated into the same IC.

Preferably, in the lamp holder as described above, the LED driving circuit comprises:
an AC/DC converting unit;
a linear constant current coupled to the AC/DC converting unit.

BRIEF DESCRIPTION OF THE DRAWINGS

The foregoing and other objects, features, and advantages of the invention will be apparent from the following more particular description of preferred embodiments as illustrated in the accompanying drawings in which.

LIST OF REFERENCE SIGNS

Figure 1A:
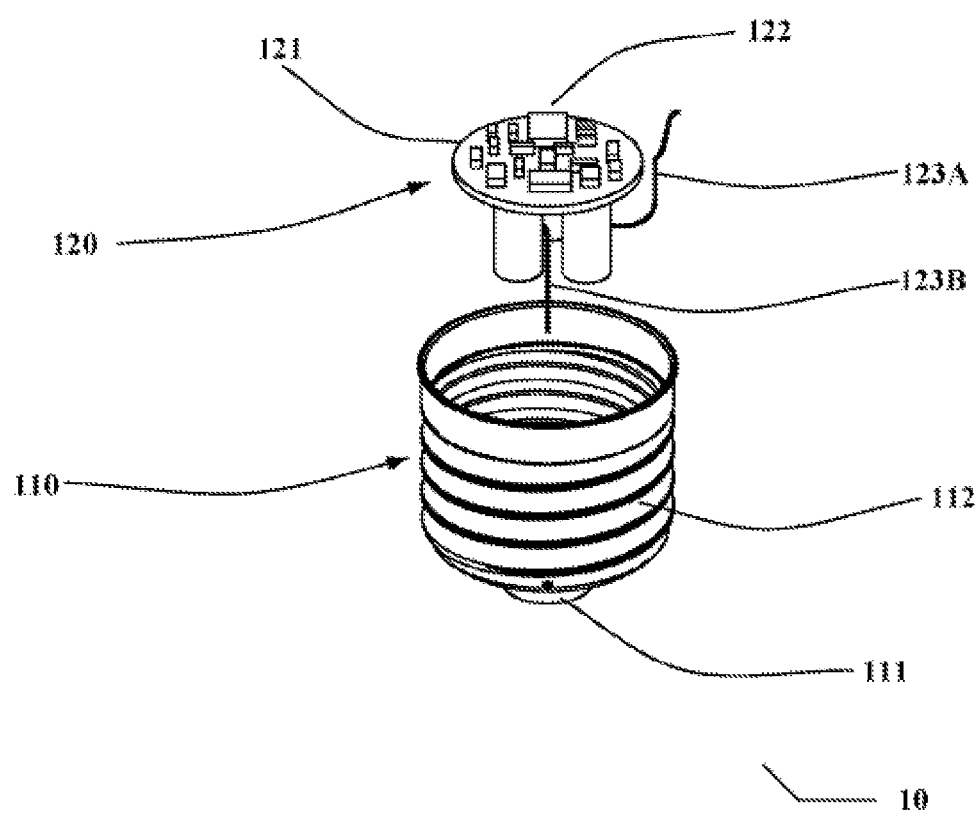
FIG. 1A is an exploded view illustrating a lamp holder according to one embodiment of the present invention.

10 Lamp holder
110 Housing
111 Base
1111 Via hole
112 Side wall
113 Electrical contact member
1131 Metal rod
1132 Metal patch
120 LED driving power supply
121 Baseplate
1212 Circuit wire
122 LED driving circuit
123A First input electrode
123B Second input electrode
431 Bridge rectifying and filtering unit
432A DC-DC boost converting unit
432B DC-DC buck converting unit
433 Feedback unit
434 Linear constant current unit
4341 Reference voltage circuit
4342 Error amplifier
BR1 Full bridge rectifier
C1, C2, C3, C4, C5, C6 Capacitor
D1 Switching diode
L1, L2 inductor
LED1-LEDn LEDs
Q1 Transistor
R1, R2, R3, R4, R5, R6, R7 Resistor
T1, T2, T3 MOS transistor
U1, U4 Switching Regulator
U2, U3 PWM controller

DESCRIPTION OF THE EMBODIMENTS

It is to be noted that any feature of any of the embodiments disclosed herein may be applied to any other embodiment, wherever appropriate. Likewise, any advantage of any of the embodiments may apply to the other embodiments, and vice versa. Other objectives, features and advantages of the enclosed embodiments will be apparent from the following description.

In the disclosure herein, unless explicitly stated, the term "semiconductor wafer" refers to a plurality of independent circuits formed on semiconductor material such as Si and GaAs, "semiconductor die" or "die" refer to one of the independent circuits, and "packaged chip" refers to a physical structure where the semiconductor die or dice are packaged. In a typical physical structure, the semiconductor die or dice are, for example, arranged on a frame and then packaged with encapsulating material.

The term "light-emitting diode component" refers to a component containing electroluminescence material. The examples of such component include but are not limited to P-N junction inorganic semiconductor light-emitting diode and organic light-emitting diode (OLED) and polymer light-emitting diode (PLED)).

The P-N junction inorganic semiconductor light-emitting diode may be taken in a wide range of structure, for example, including light-emitting diode die and light-emitting diode device. The term "light-emitting diode die" refers to a semiconductor die having a P-N junction and achieving electroluminescence, and the term "light-emitting diode device" refers to a physical structure formed by packaging the LED die or dice. In a typical physical structure, the LED die or dice are, for example, arranged on a frame and then packaged with encapsulating material.

The term "wire", "wiring pattern" and "wire layer" refer to conductive pattern arranged on or in isolating material and used for providing electrical connection between components, including but not limited to trace and hole such as pad, component hole, fastening hole and metalized hole.

The term "thermal radiation" is electromagnetic radiation generated by the thermal motion of charged particles in matter with a temperature.

The term "thermal conduction" is the transfer of heat from a hotter to a colder body.

The term "ceramic material" refers to an inorganic, non-metallic solid material, including but not limited to silicate, oxide, carbide, nitride, sulfide and boride.

The term "thermal conducting insulating polymer composite material" refers to polymer material having high thermal conductivity by filling metal or inorganic material with high thermal conductivity therein. The examples of the thermal conducting insulating polymer composite material includes but is not limited to polypropylene with alumina, polycarbonate with alumina, silicon carbide (SiC) and bismuth oxide, and acrylonitrile butadiene styrene copolymers. Further description on the thermal conducting insulating polymer composite material may be found in "Thermal conducting insulating polycarbonate and polycarbonate/ABS polymers" by L I li et al., *Transaction of Material and Heat Treatment*, pp 51-54, Vol. 28, No. 4, August 2007, and "The application of $Al_2O_3$ in thermal conducting and insulating polymer composite" by L I Bing et al., *Plastic Additives*, pp 14-16, No. 3, 2008, both of which are incorporated by reference herein.

The term "infrared radiating material" refers to material transferring energy through electromagnetic radiation with the peak wavelength within the infrared radiation range and with a high emissivity. The examples of the infrared radiating material include but are not limited to graphite and room temperature infrared radiation ceramics material. Moreover, the examples of the room temperature infrared radiation ceramics material include but are not limited to at least one selected from the following group: magnesium oxide, alumina, calcium oxide, titanium oxide, silica, chromium hemitrioxide, iron oxide, manganese oxide, zirconia, barium oxide, dichroite, mullite, boron carbide, silicon carbide, titanium carbide, molybdenum carbide, tungsten carbide, zirconium carbide, tantalum carbide, boron nitride, aluminium nitride, silicon nitride, zirconium nitride, titanium nitride, titanium silicate, molybdenum silicate, tungsten silicate, titanium boride, zirconium boride and chromium boride. Further description on the infrared radiation ceramics material may be found in "Study and application on high efficiency infrared radiation ceramics material" by L I Hongtao et al., *Modern Technology Ceramics*, pp 24-26, No. 2, 2005, and "Study and application on high radiation infrared radiation ceramics material" by WANG Qianping et al., *Journal of Ceramics*, No. 3, 2011, both of which are incorporated by reference herein.

In the present invention, preferably, the following principle is used for selecting the infrared radiation material: the infrared radiation material maintains high emissivity, e.g., ≥70%, below a predetermined LED P-N junction temperature, e.g., within a range of 50-80° C.

The term "lamp holder" refers to a lamp member electrically connected to a power supply via a socket or lamp connecting member, which is an interface between a LED lighting apparatus and an external power supply such as a wide range of DC power supplies or AC power supplies.

The term "driving power supply" or "LED driving power supply" refer to an electronic controlling apparatus connected between an external DC or AC power supply and LED as light sources, which supplies current or voltage as required by LED, e.g., constant current, constant voltage or constant power. One or more components of the driving power supply can be taken in the form of dies or packaged IC, and those components taken in such form are referred to be as "driving controller". In specific embodiments, the driving power supply may have a modular structure, e.g., comprising a printed circuit board and one or more devices arranged thereon and electrically connected together by means of wire. The examples of the devices include but are not limited to LED driving controller chip, rectifying chip, resistor, capacitor, diode, transistor and coils. Alternatively, other functionality circuits, e.g., dimming controller chip, power factor correction circuit, sensing circuit, intelligent lighting controlling circuit, communication circuit and protection circuit, can be integrated into the driving power supply. These circuits and the driving controller can be integrated into the same semiconductor die or packaged IC, or each of these circuits can be individually implemented in the form of semiconductor die or packaged IC, or some or all of these circuits can be grouped together and implemented in the form of semiconductor die or packaged IC.

It should be noted that, as used herein, the terms "electrically connected", "electrically connecting", "coupling" and "coupled" include a direction transmission of electrical energy or signal between two elements (no intermediate materials or elements therebetween that electrically connect the two elements together), or an indirection transmission of electrical energy or signal between two elements via one or more other elements.

The terms such as "including" and "comprising" and variations thereof, as used herein, mean that it not only includes the units and steps that are described directly and explicitly, but also includes other units and steps that have not been described directly or explicitly.

The terms such as "first", "second", "third" and "fourth" are merely intended for distinguishing between individual units or values, not for representing their order in terms of time, space or amount.

The following embodiments are described with reference to the drawings.

Figure 1B:
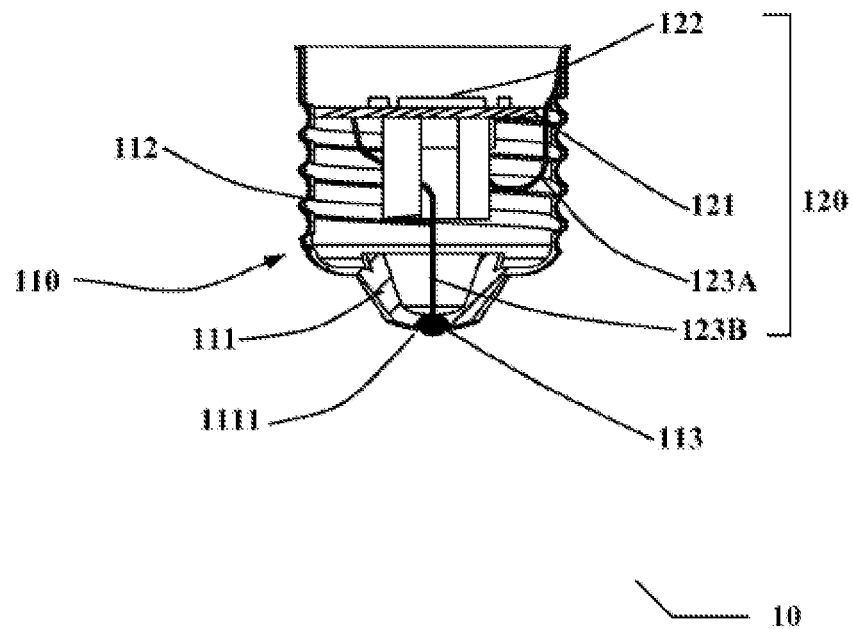
FIG. 1B is a sectional view illustrating the lamp holder as shown in FIG. 1A.

FIG. 1A is an exploded view illustrating a lamp holder according to one embodiment of the present invention. FIG. 1B is a sectional view illustrating the lamp holder as shown in FIG. 1A.

Referring to FIGS. 1A and 1B, a lamp holder 10 according to the present embodiment comprises a housing 110 and a LED driving power supply 120.

The housing 10 of the lamp holder comprises a base 111, side wall 112 and an electrical contact member 113. The base 111 is made of insulating material. As shown in FIG. 1A, the base 111 supports the side wall 112 and electrically isolates an electrical area of the side wall 112 from the electrical contact member 113 fixed to the bottom of the base 111.

The side wall 112 is made of conducting material and is fixed to the base 111, e.g., by bonding. A plurality of turns of screw thread are formed on the outer surface of the side wall 112. The conducting material includes but is not limited to pure metal, alloy therefore, or nonmetal such as graphite. Preferably, copper based alloy including at least one element selected from the following group may be used as the conducting material: zinc, aluminum, plumbum, tin, manganese, nickel, iron and silicon. In the case of using the above-mentioned copper based alloy for the side wall, it is advantageous to improve corrosion resistance. As a result, the lifetime of the lamp holder can match that of LED source.

Figure 2:
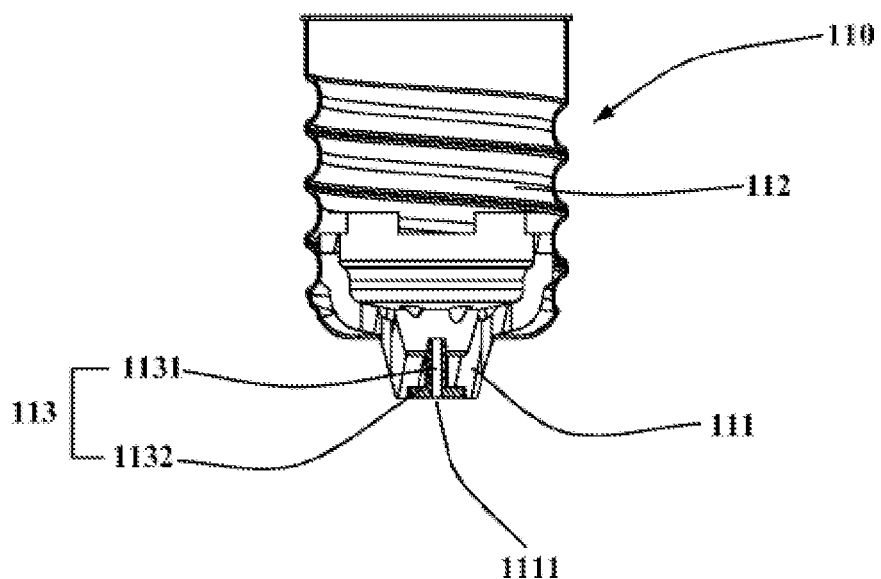
FIG. 2 is a sectional view illustrating a housing applicable in the lamp holder as shown in FIG. 1A.

The electrical contact member 113 can be taken in a wide range of structural forms. For example, as shown in FIG. 1A, a via hole 1111 is formed at the bottom of the base 111 and is filled with conducting material, e.g., tin solder, as the electrical contact member 113. As another example, the structure as shown in FIG. 2 is available, where the electrical contact member 113 includes a metal rod 1131 embedded into the via hole 1111 of the base 111 and a metal patch 1132 fixed at one end of the metal rod 1131.

In the present embodiment, the side wall 112 and the electrical contact member 113 are used as electrode connecting areas to provide electrical connection between the LED driving power supply 120 and an external power supply. A typical illumination circuitry comprises two wires, i.e., a live wire and a neutral line. In the present embodiment, for the sake of safety, the side wall 112 and the electrical contact member 113, as the electrode connecting areas, are respectively connected to the neutral line and the live wire via the electrodes of a lamp socket (not shown).

It should be noted that although the housing 10 as shown herein is taken in the form of an Edison screw cap used in incandescent lamps and fluorescent lamps, a bayonet cap is available. It should be further noted that the side wall is either completely made of the conducting material as described above, or is conducting on a part of the side wall. In the latter circumstance, the conducting area of the side wall 112 and the electrical contact member 113 are used as the electrode connecting areas.

Referring to FIGS. 1A and 1B, the LED driving power supply is arranged in the housing 10 and consists of one or more separate components. In the present embodiment, the LED driving power supply 120 comprises a baseplate 121, a LED driving circuit 122 on the baseplate 121 and a first input electrode 123A and a second input electrode 123B.

The baseplate 121 may be made of thermal conducting insulating material such as ceramic material or thermal conducting insulating polymer composite material or infrared radiating material such as SiC. Alternatively, the baseplate 121 may be made of PCB material such as aluminum plate material. As shown in FIG. 1B, the baseplate 121 is arranged inside the housing 110 and has a side surface fixed to the inside surface of the side wall 112. This may be achieved by applying adhesive material such as silica gel and epoxy resin on the side surface of the baseplate or the inside surface of the side wall and then curing it. It should be noted that the baseplate may be fixed inside the housing in other manners. For example, the baseplate may be fixed to the base of the housing by adhesive material or screws.

LED driving circuit 122 comprises a plurality of components arranged on the substrate 121 and electrically connected together via wires on the substrate.

As shown in FIGS. 1A and 1B, in the present embodiment, the first and second input electrodes 123A, 123B are in form of wire. The first input electrode 123A extends downwards from the substrate 121, and then extends upwards and reaches the inner surface of the side wall 112 so as to establish electrical connection. On the other hand, the second input electrode 123B extends downwards from the substrate 121 and reaches the electrical contact member 113 so as to establish electrical connection.

Figure 3A:
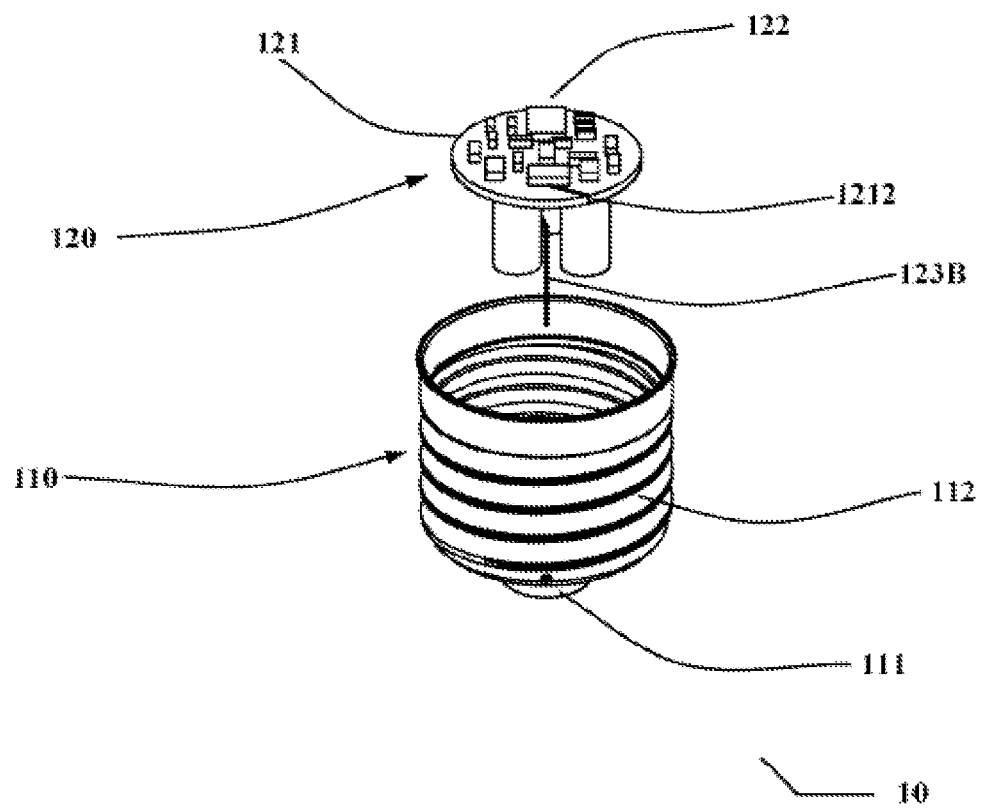
FIG. 3A is an exploded view illustrating a lamp holder according to another embodiment of the present invention.
Figure 3B:
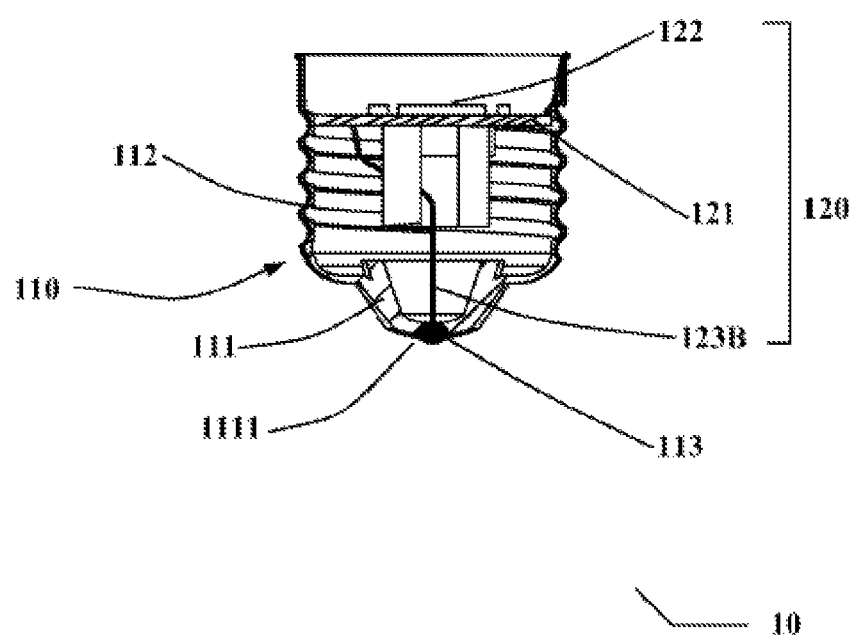
FIG. 3B is a cross-section view illustrating the lamp holder as shown in FIG. 3A.

FIG. 3A is an exploded view illustrating a lamp holder according to another embodiment of the present invention, and FIG. 3B is a cross-section view illustrating the lamp holder as shown in FIG. 3A.

The present embodiment mainly differs from one described with reference to FIGS. 1A and 1B in the first input electrode. The following description will be focused on the differences between two embodiments.

As shown in FIGS. 3A and 3B, in the present embodiment, one of the input electrodes of the LED driving circuit 122 extends to the side of the substrate via circuit wire 1212, whereby the circuit wire 1212 is electrically connected to the side wall 113 or a conductive area thereon and thus acts as the first input electrode while the substrate 121 is fixed to the inner surface of the side wall. Similar to the previous embodiment, the second input electrode 123B is in the form of wire extending downwards from the substrate 121 and reaching the electrical contact member 113.

In the embodiments as shown in FIGS. 1A, 1B, 2, 3A and 3B, the LED driving circuit 122 can supply LEDs with suitable current or voltage in a plurality of modes, e.g., constant current mode, constant voltage mode and constant power mode. For different external supply powers, the LED driving circuit 122 can be in a wide range of circuit structure, e.g., including but not limited to non-isolated buck circuit, flyback circuit and half-bridge LLC circuit. Further description on the driving circuit may be found in "Design on LED driving power supply and LED lamp" by MAO Xinwu et al., *Posts & Telecom Press*, May 2011, which is incorporated by reference herein.

Figure 4:
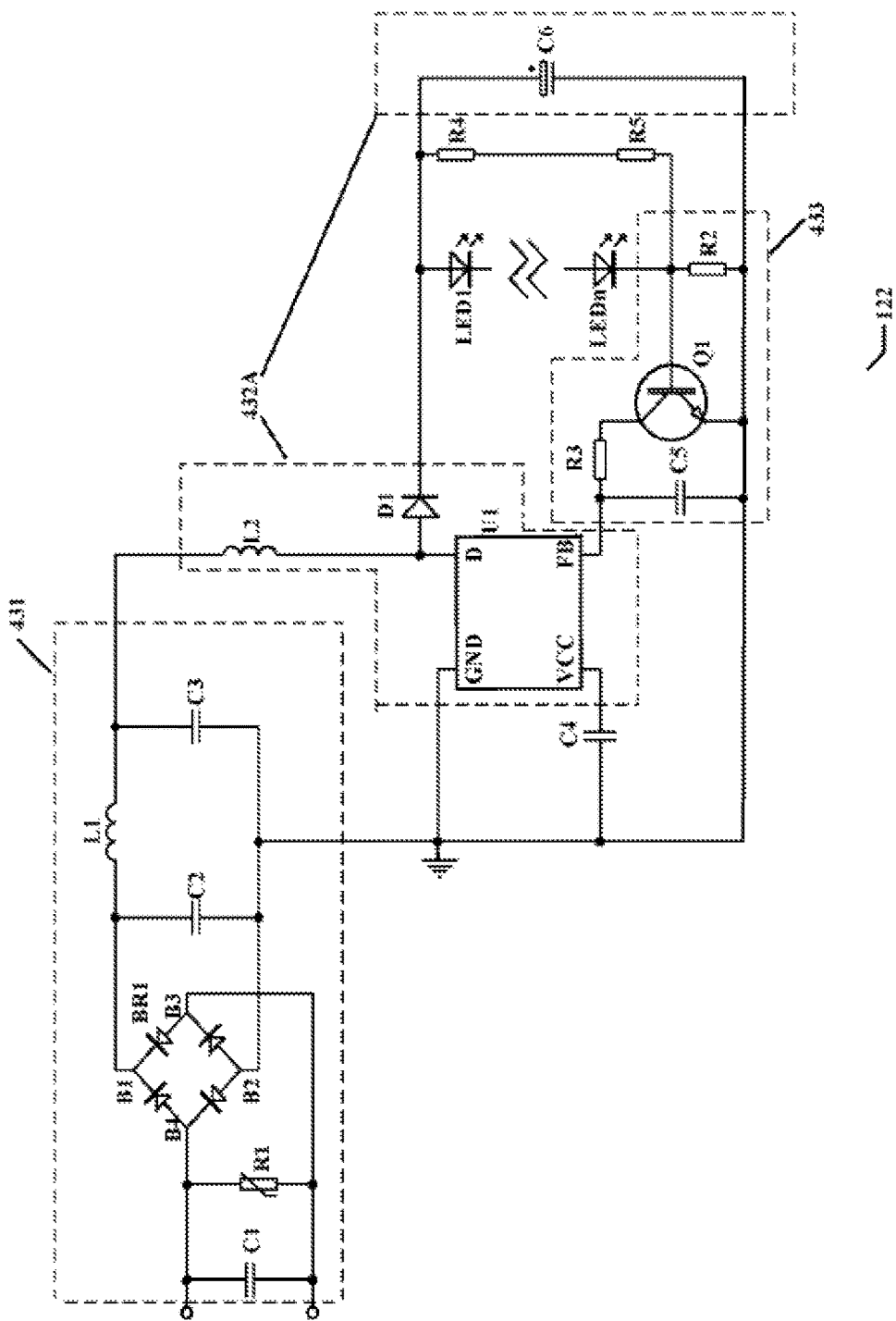
FIG. 4 is a schematic diagram illustrating a LED driving circuit applicable in the lamp holders as shown in FIGS. 1A, 1B, 2, 3A and 3B.

FIG. 4 is a schematic diagram illustrating a LED driving circuit applicable in the lamp holders as shown in FIGS. 1A, 1B, 2, 3A and 3B.

The LED driving circuit 122 as shown in FIG. 4 comprises a bridge rectifying and filtering unit 431, a DC-DC boost converting unit 432A and a feedback unit 433, which are further described hereinafter.

As shown in FIG. 4, the bridge rectifying and filtering unit 431 comprises a full bridge rectifier BR1, capacitors C1, C2, C3, a voltage dependent resistor R1 and an inductor L1. Alternative current power, e.g., available from city power grid, is rectified by the full bridge rectifier BR1 and supplied in form of full wave pulse voltage at a positive terminal B1. The filtering capacitors C1, C2, C3, voltage dependent resistor R1 and inductor L1 constitute an EMI filtering circuit, which suppresses impact from high frequency interference from AC power grid and on the other hand, suppresses electromagnetic interference from the driving circuit to the AC power grid.

Referring to FIG. 4, the filtering capacitor C4 and voltage dependent resistor R1 are connected in parallel between AC input terminals B3 and B4 of the full bridge rectifier BR1, wherein the voltage dependent resistor R1 clamps the input voltage for the full bridge rectifier BR1 at a predetermined level by suppressing abnormal voltage in the circuit. The filtering capacitors C2, C3 and inductor L1 constitute a π-type filtering circuit, which is electrically connected between a positive terminal B1 and a negative terminal B2 of the full bridge rectifier BR1 so as to lowpass filter pulse voltage output from the full bridge rectifier BR1. The negative terminal B2 is connected to the electrical grounding.

It should be noted that although full wave rectification is used herein, half wave rectification is also applicable. Furthermore, the EMI filtering circuit in the bridge rectifying and filtering unit 431 can be removed to simplify circuit structure.

The DC-DC boost converting unit 432A is electrically connected to the bridge rectifying and filtering unit 431, the feedback unit 433 and LED load LED1-LEDn connected in series, and converts the power with the pulse voltage output from the bridge rectifying and filtering unit 431 into one having voltage and current levels as required and then outputs it to the LED load. Furthermore, The DC-DC boost converting unit 432A cooperates with the feedback unit 433 so as to supply constant current and voltage to the LED load and to perform power factor correction.

In the LED driving circuit as shown in FIG. 4, the DC-DC boost converting unit 432A comprises an inductor L2, a switching diode D1, a capacitor C6 and a switching regulator U1.

Preferably, the switching regulator U1 can be implemented as an integrated circuit chip incorporating a pulse width modulation (PWM) controller and a metal-oxide semiconductor field effect transistor (MOS transistor), wherein an output port of the PWM controller is electrically connected to a gate of the MOS transistor so as to control ON and OFF states of the MOS transistor. In one specific example of the switching regulator, in order to simplify duty cycle regulation, switching frequency of the MOS transistor is constant, e.g., about 1 MHz and its pulse turn-off time is tunable; alternatively, the turn-off time of the MOS transistor is constant, e.g., about 320 ns and the switching frequency is tunable. Typically, the switching regulator is provided with a drain pin electrically connected to a drain of the MOS transistor and a feedback pin electrically connected to a controlling terminal of the PWM controller. The examples of the above switching regulator include but are not limited to IC chip CW12L31, which is available from Shanghai Chipswinner electronics Ltd., China.

As shown in FIG. 4, the inductor L2 and the switching diode D1 are connected in series between the bridge rectifying and filtering unit 431 and the LED load, wherein an anode of the switching diode D1 is electrically connected to the inductor L2, a cathode of the switching diode D1 is electrically connected to an anode of the LED load. Preferably, a Schottky diode with short response time and small voltage drop may be used as the switching diode D1. With reference to FIG. 4, the drain pin D of the switching regulator U1 is electrically connected between the inductor L2 and the anode of the switching diode D1, and the feedback pin FB, which is referred to as a controlling terminal as it is electrically connected to the controlling terminal of the PWM controller inside the switching regulator, is electrically connected to the feedback unit 433. Moreover, in the circuit as shown in FIG. 4, a capacitor C6 and the anode of the LED load are commonly connected to the cathode of the switching diode D1 so as to charge the LED load while the switching diode D1 is reverse biased.

Referring to FIG. 4, the switching regulator U1 comprises a power supply pin VCC and an electrical grounding pin GND, wherein the power supply pin VCC is connected to the electrical grounding via a capacitor C4.

The feedback unit 433 comprises a transistor Q1, resistors R2, R3 and a capacitor C5. As shown in FIG. 4, the transistor Q1 is arranged in common-emitter configuration where its collector is electrically connected to the feedback pin FB of the switching regulator U1 via the resistor R3 so as to supply a feedback signal with the switching regulator U1, its emitter is electrically connected to the electrical grounding so as to act as a common electrical grounding for an input loop and an output loop, and its base is connected to the loop comprising the LED load so as to take a detective signal associated with the LED load. The resistor R2 is connected between the base and the electrical grounding so as to form the input loop. Moreover, the feedback pin FB of the switching regulator U1 is connected to the electrical grounding via the capacitor C5.

The operational process for the LED driving circuit 122 as shown in FIG. 4 will be described as follows.

When AC power supply is switched on, the bridge rectifying and filtering unit 431 converts AC power into one having pulse voltage, which, in turn, is output to the inductor L2 of the DC-DC boost converting unit 432A. Under the control of the signal from the PWM controller, the MOS transistor inside the switching regulator U1 is alternately in ON and OFF states with very high frequency.

When the MOS transistor is in the ON state, under the output voltage from the bridge rectifying and filtering unit 431, current flows through the inductor L2 and the MOS transistor, and the switching diode D1 is reverse biased due to voltage across the capacitor C6. As the current flowing through the inductor L2 increases, more energy is stored in the inductor. At this phase, the LED load is powered by the capacitor 6, i.e., it operates by means of discharging current from the capacitor C6.

When the MOS transistor is in the OFF state, the current flowing through the inductor L2 decreases. As a result, electromotive force is induced across the inductor L2 where the upper terminal of the inductor L2 is positive and the lower terminal is negative in terms of polarity. The induced electromotive force is added to the output voltage from the bridge rectifying and filtering unit 431 so as to boost the output voltage. At this phase, the boosted voltage is above the voltage across the capacitor C6. Thus the switching diode D1 is forward biased and the LED load is powered by the inductor L2. Meanwhile, the capacitor C6 is charged by the inductor L2 until the MOS transistor switches to the ON state. In the circuit structure as shown in FIG. 4, the amplitude of the induced electromotive force depends on the duty cycle for the MOS transistor, and thus the extent to which the voltage is boosted can be obtained by regulating the duty cycle for the output signal from the PWM controller.

When the MOS transistor switches to the ON state again, the boosted voltage across the switching diode D1 begins to decrease and will be below the voltage across the capacitor C6. Therefore, the switching diode D1 is reverse biased and the LED load is powered by the capacitor C6 and the inductor L2 begins to be energized.

From the above, under the control of the PWM controller, the MOS transistor alternately switches between the ON and OFF states so as to maintain a higher level for the voltage applied to the anode of the LED load.

Referring to FIG. 4, the LED load and the resistors R4, R5 are connected in parallel between the cathode of the switching diode D1 and the base of the transistor Q1. When the current and/or voltage flowing through the LED load fluctuate, the current flowing through the base of the transistor Q1 will change. A feedback signal amplified by the transistor Q1 is output from the collector to the feedback pin of the switching regulator U1 via the resistor R3. As a result, the PWM controller can make current and voltage supplied to the LED load constant by regulating the duty cycle of the output signal based on the feedback signal.

In the circuit structure as shown in FIG. 4, the feedback pin FB is further connected to the electrical grounding via the capacitor C5 with high capacitance. This leads to a flat response for the feedback loop and the level for the feedback signal is substantially constant during an AC half cycle. The substantially constant level represents average energy supplied to the LED load during the AC half cycle. Since the switching regulator U1 operates at a fixed frequency, current increment will not exceed a certain range before the completion of the ON state for the MOS transistor. The ripple at the anode of the LED load can be minimized by decreasing switching current flowing through the MOS transistor when AC input voltage increases whereas increasing the switching current flowing through the MOS transistor when AC voltage decreases. Moreover, with the above arrangement, AC input current can follow the change of AC input voltage so as to perform the power factor correction.

It should be noted that in the embodiment as shown in FIG. 4, the PWM controller and MOS transistor are incorporated in the same integrated circuit chip. In order to increase integration level, it is considerable to incorporate the transistor Q1, the PWM controller and MOS transistor in the same integrated circuit chip.

Alternatively, the PWM controller and the MOS transistor may be in form of discrete circuit components in the lamp holder according to the embodiments as shown in 1A, 1B, 2, 3A and 3B. One of such examples is the driving power supply as shown in FIG. 5 where the same or similar elements are assigned to the identical reference signs.

Figure 5:
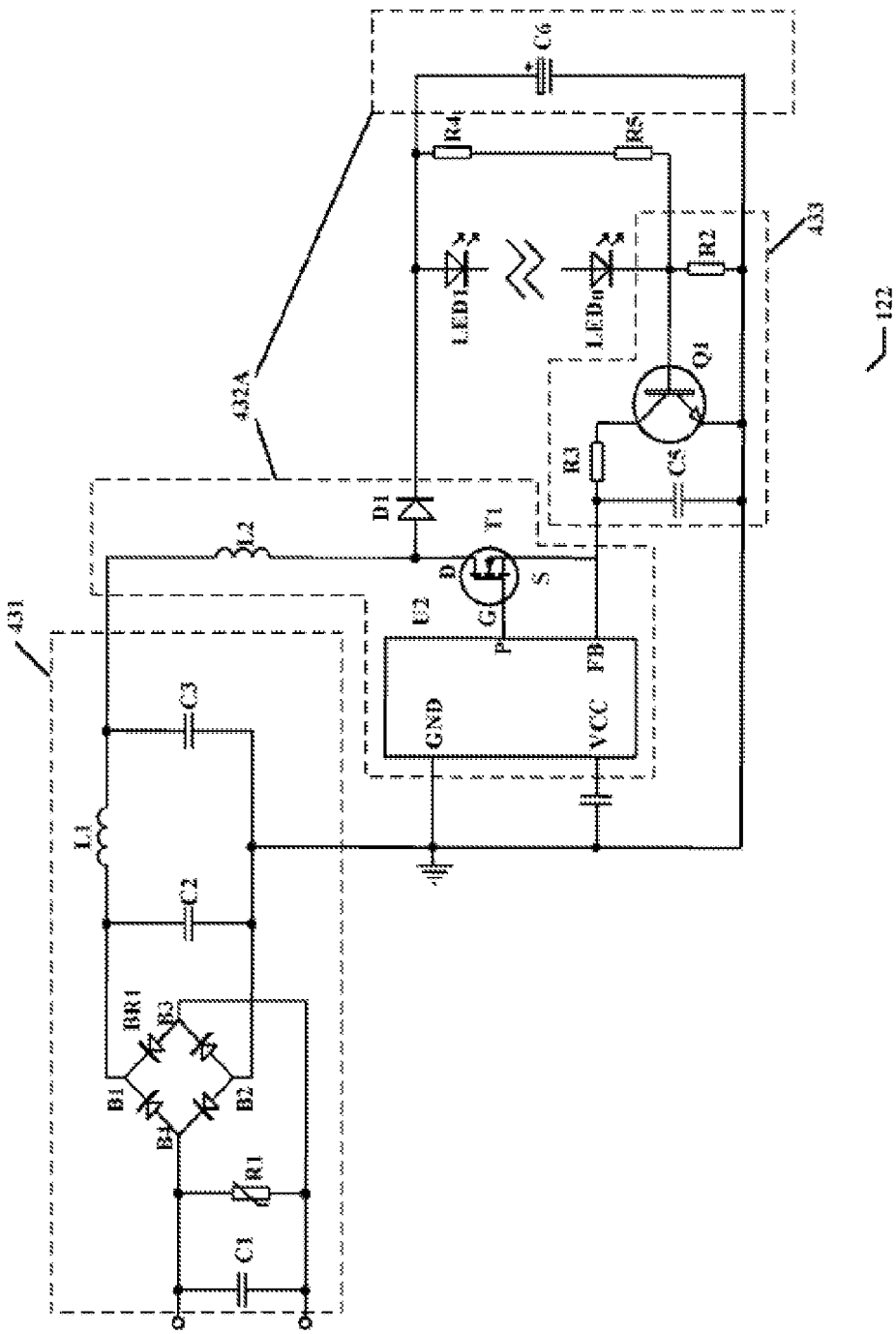
FIG. 5 is a schematic diagram illustrating another LED driving circuit applicable in the lamp holders as shown in FIGS. 1A, 1B, 2, 3A and 3B.

The LED driving circuit 122 as shown in FIG. 5 also comprises a bridge rectifying and filtering unit 431, a DC-DC boost converting unit 432A and a feedback unit 433, among which the bridge rectifying and filtering unit 431 and the feedback unit 433 have the same structures as that of FIG. 4.

Referring to FIG. 5, the DC-DC boost converting unit 432A comprises an inductor L2, a switching diode D1, a capacitor C6, a PWM controller U2 and a MOS transistor T1. The inductor L2 and the switching diode D1 are connected in series between the bridge rectifying and filtering unit 431 and an anode of the LED load, wherein an anode of the switching diode D1 is electrically connected to the inductor L2, a cathode of the switching diode D1 is electrically connected to the anode of the LED load. In the present embodiment, a drain D of the MOS transistor T1 is electrically connected between the inductor L2 and the anode of the switching diode D1, a source S of the MOS transistor T1 is electrically connected to a controller terminal FB, and a gate G of the MOS transistor T1 is connected to an output port P of the PWM controller U2. Typically, the PWM controller U2 is implemented in form of integrated circuit chip where the controller terminal FB is electrically connected to the feedback unit 433. As shown in FIG. 5, the capacitor C6 and the anode of the LED load are commonly connected to the cathode of the switching diode D1 so as to charge the LED load while the switching diode D1 is reverse biased.

The feedback unit 433 also comprises a transistor Q1, resistors R2, R3 and a capacitor C5. The transistor Q1 is arranged in common-emitter configuration where its collector is electrically connected to the controller terminal FB of the PWM controller U2 via the resistor R3 so as to supply a feedback signal with the PWM controller U2, its emitter is electrically connected to the electrical grounding so as to act as a common electrical grounding for an input loop and an output loop, and its base is connected to the loop comprising the LED load so as to take a detective signal associated with the LED load. The controller terminal FB of the PWM controller U2 is further connected to the electrical grounding via the capacitor C5.

The operational process of the driving power supply as shown in FIG. 5 is similar to that of the power supply as shown in FIG. 4 and thus will not be described.

Figure 6:
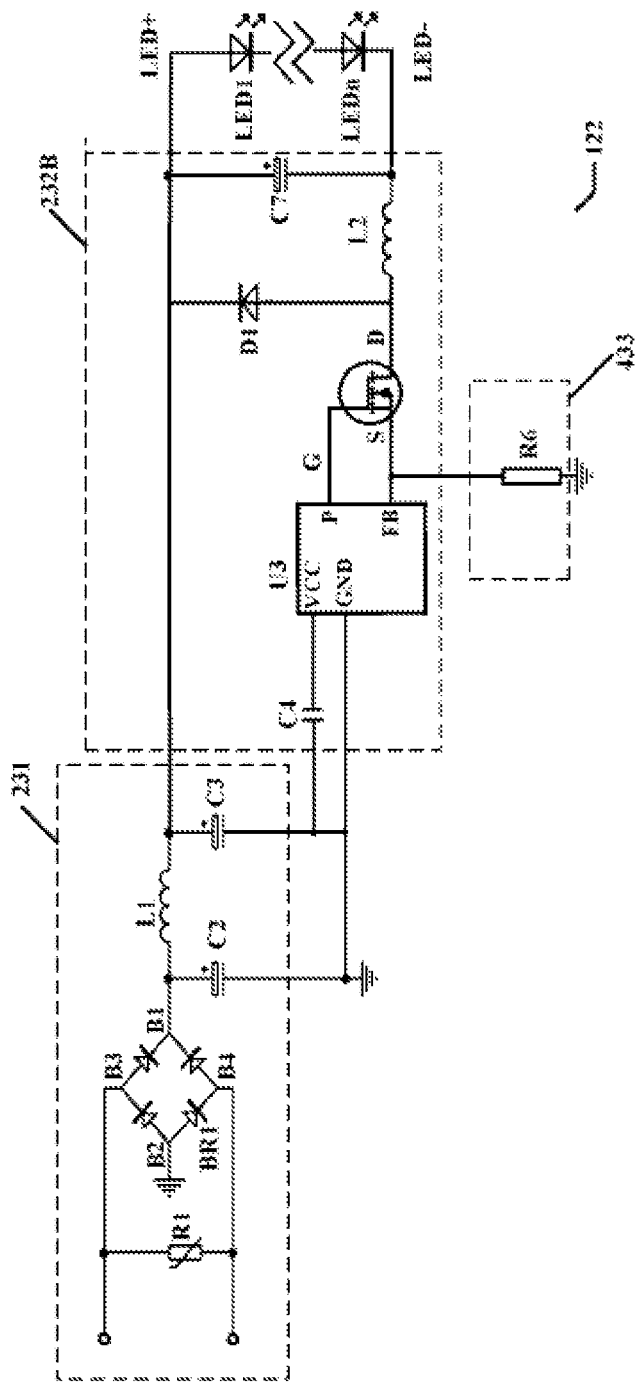
FIG. 6 is a schematic diagram illustrating another LED driving circuit applicable in the lamp holders as shown in FIGS. 1A, 1B, 2, 3A and 3B.

FIG. 6 is a schematic diagram illustrating another LED driving circuit applicable in the lamp holders as shown in FIGS. 1A, 1B, 2, 3A and 3B.

The LED driving circuit 122 as shown in FIG. 6 comprises a bridge rectifying and filtering unit 431, a DC-DC buck converting unit 432B and a feedback unit 433, which are further described hereinafter.

As shown in FIG. 6, the bridge rectifying and filtering unit 431 comprises a full bridge rectifier BR1, capacitors C2, C3, a voltage dependent resistor R1 and an inductor L1. Alternative current power, e.g., available from city power grid, is rectified by the full bridge rectifier BR1 and supplied in form of full wave pulse voltage at a positive terminal B1. The filtering capacitors C2, C3, voltage dependent resistor R1 and inductor L1 constitute an EMI filtering circuit, which suppresses impact from high frequency interference from AC power grid and on the other hand, suppresses electromagnetic interference from the driving circuit to the AC power grid.

Referring to FIG. 6, the voltage dependent resistor R1 are connected in parallel between AC input terminals B3 and B4 of the full bridge rectifier BR1, wherein the voltage dependent resistor R1 clamps the input voltage for the full bridge rectifier BR1 at a predetermined level by suppressing abnormal voltage in the circuit. The filtering capacitors C2, C3 and inductor L1 constitute a π-type filtering circuit, which is electrically connected between a positive terminal B1 and a negative terminal B2 of the full bridge rectifier BR1 so as to lowpass filter pulse voltage output from the full bridge rectifier BR1.

It should be noted that although full wave rectification is used herein, half wave rectification is also applicable. Furthermore, the voltage dependent resistor R1, the filtering capacitors C2, C3 and the inductor L1 in the bridge rectifying and filtering unit 431 can be removed to simplify circuit structure.

The DC-DC buck converting unit 432B is electrically connected to the bridge rectifying and filtering unit 431, the feedback unit 433 and LED load LED1-LEDn, and converts the power with the pulse voltage output from the bridge rectifying and filtering unit 431 into one having voltage and current levels as required and then outputs it to the LED load. Furthermore, The DC-DC buck converting unit 432B cooperates with the feedback unit 433 so as to supply constant current and voltage to the LED load.

In the LED driving circuit power supply as shown in FIG. 6, the DC-DC buck converting unit 432B comprises an inductor L2, a switching diode D1, a capacitor C7, a MOS transistor T2 and a PWM controller U3.

An output port P of the PWM controller is electrically connected to a gate of the MOS transistor T2 so as to control ON and OFF states of the MOS transistor. The examples of the above PWM controller include but are not limited to HV9910 LED driver chip, which is available from Supertex Inc., USA.

As shown in FIG. 6, an cathode of the switching diode D1 and an anode LED+ of the LED load are connected commonly to an output terminal of the bridge rectifying and filtering unit 431, an anode of the switching diode D1 is electrically connected to a drain D of the MOS transistor T2. Preferably, a Schottky diode with short response time and small voltage drop may be used as the switching diode D1. The inductor L2 is electrically connected between an cathode LED− of the LED load and the drain D of the MOS transistor T2. Further referring to FIG. 6, the PWM controller U3 comprises a feedback pin FB which is electrically connected to the feedback unit 433. Moreover, in the circuit as shown in FIG. 6, a capacitor C7 is connected in parallel between the anode LED+ and the cathode LED− of the LED load to smooth operational voltage supplied with the LED load. The capacitance of the capacitor C7 may be determined based on an allowed ripple level for the operational voltage.

Referring to FIG. 6, the PWM controller U3 comprises a power supply pin VCC and an electrical grounding pin GND, wherein the power supply pin VCC is connected to the electrical grounding via a capacitor C4.

The feedback unit 433 comprises a resistor R6. As shown in FIG. 6, the resistor R6 is electrically connected between the source S of the MOS transistor T2 and the electrical grounding. On the other hand, the terminal of the resistor R6 electrically connected to the source S is further electrically connected the feedback pin FB of the PWM controller U3 so as to supply a feedback signal with the PWM controller U3.

The operational process for the LED driving circuit 122 as shown in FIG. 6 will be described as follows.

When AC power supply is switched on, the bridge rectifying and filtering unit 431 converts AC power into one having pulse voltage, which, in turn, is output to the DC-DC buck converting unit 432B. Under the control of the PWM controller U3, the MOS transistor T2 is alternately in ON and OFF states so as to maintain voltage across the LED load at a certain level.

In particular, when the MOS transistor T2 is in the ON state, the switching diode D1 is reverse biased. The output current from the bridge rectifying and filtering unit 431 flows to the inductor L2 via the anode LED+ and the cathode LED− of the LED load. The current flowing through the inductor L2 will gradually increase until the MOS transistor T2 is in the OFF state. As the current flowing through the inductor L2 increases, more energy is stored in the inductor.

When the MOS transistor T2 is in the OFF state, the current flowing through the inductor L2 decreases. As a result, electromotive force is induced across the inductor L2 where the left terminal of the inductor L2 is positive and the right terminal is negative in terms of polarity. The induced electromotive force is added to the output voltage from the bridge rectifying and filtering unit 431 so as to be above the voltage across the capacitor C7. Thus the switching diode D1 is forward biased and acts as a flyback diode for the current flowing through the inductor L2 until the MOS transistor T2 returns to the ON state. In the circuit structure as shown in FIG. 6, the decreasing amplitude of the voltage as desired can be obtained by regulating the duty cycle for the output signal from the PWM controller.

Referring to FIG. 6, the resistor R6 is electrically connected between the source S of the MOS transistor T2 and the electrical grounding. Since the voltage across the resistor R6 corresponds to the current flowing through the MOS transistor T2 and the inductor L2, this voltage can be used as an feedback signal applied to the feedback pin FB of the PWM controller U3. In particular, when the MOS transistor T2 is in the ON state, the current flowing through the inductor L2 will gradually increase. If the voltage across the resistor R6 exceeds a predetermined threshold associated with a current peak for the MOS transistor T2, the PWM controller U3 will be triggered to output a control signal for turning off the MOS transistor T2 at a pin P. As a result, a constant current can be obtained by controlling the peak current for the MOS transistor T2. The time period for achieving the peak current depends on inductance of the inductor L2. Particularly, the more the inductance is (this means the current increases more slowly), the more the time period is needed to achieve the peak current, and vice versa.

It should be noted that as shown in FIG. 6, the capacitor C7 is connected in parallel between the LED load and thus the current through the LED load becomes more stable by smoothing the fluctuate of the current.

Alternatively, the PWM controller U3 and MOS transistor T2 may be arranged in the lamp holder according to the embodiments as shown in 1A, 1B, 2, 3A and 3B in form of a single integrated circuit chip. One of such examples is the driving power supply as shown in FIG. 7 where the same or similar elements are assigned to the identical reference signs.

Figure 7:
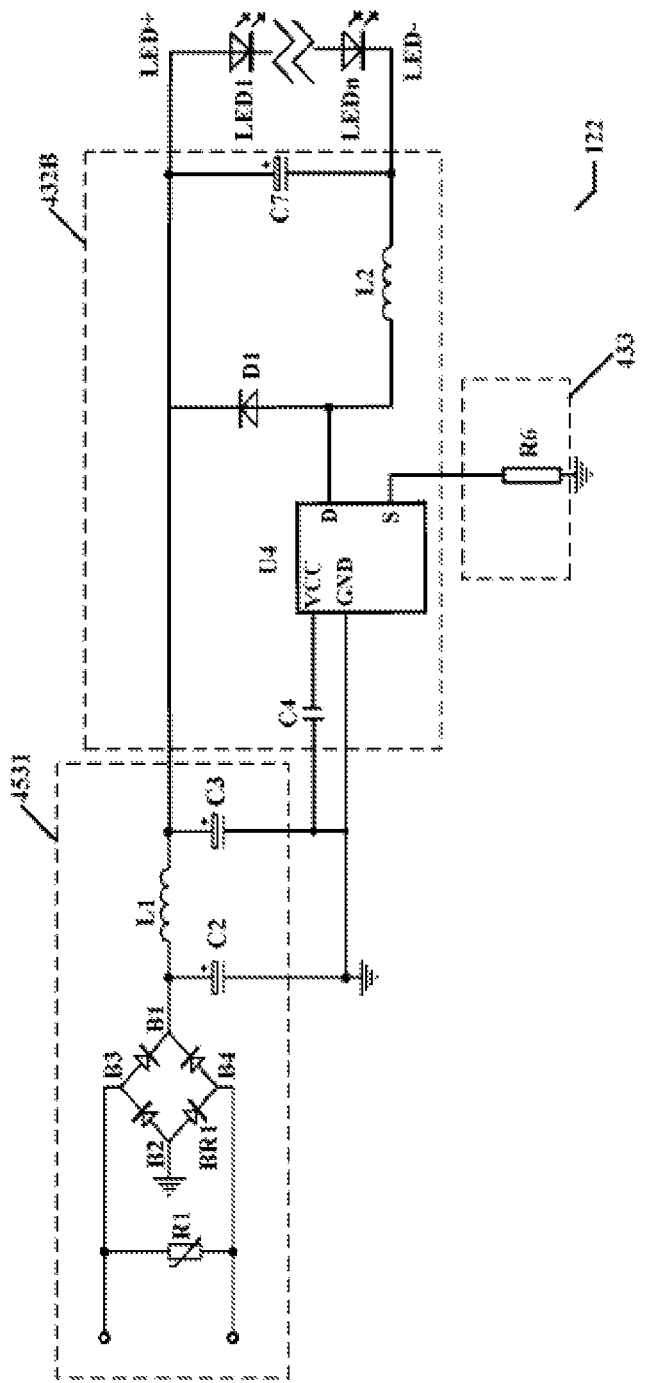
FIG. 7 is a schematic diagram illustrating another LED driving circuit applicable in the lamp holders as shown in FIGS. 1A, 1B, 2, 3A and 3B.

The LED driving circuit 122 as shown in FIG. 7 also comprises a bridge rectifying and filtering unit 431, a DC-DC buck converting unit 432B and a feedback unit 433, among which the bridge rectifying and filtering unit 431 and the feedback unit 433 have the same structures as that of FIG. 6.

The DC-DC buck converting unit 432B is electrically connected to the bridge rectifying and filtering unit 431, the feedback unit 433 and LED load LED1-LEDn and converts the power with the pulse voltage output from the bridge rectifying and filtering unit 431 into one having voltage and current levels as required and then outputs it to the LED load. Furthermore, The DC-DC buck converting unit 432B cooperates with the feedback unit 433 so as to supply constant current and voltage to the LED load.

In the LED driving circuit power supply as shown in FIG. 7, the DC-DC buck converting unit 432B comprises an inductor L2, a switching diode D1, a capacitor C7 and a switching regulator U4.

Preferably, the switching regulator U4 can be implemented as an integrated circuit chip incorporating a pulse width modulation (PWM) controller and a MOS transistor, wherein an output port of the PWM controller is electrically connected to a gate of the MOS transistor so as to control ON and OFF states of the MOS transistor. Typically, the switching regulator is provided with a drain pin electrically connected to a drain of the MOS transistor and a source pin electrically connected to a source of the MOS transistor. Preferably, the source pin is electrically connected to the control port of the PWM controller so as to feedback a detective signal corresponding to the current flowing through the MOS transistor to the PWM controller. The examples of the above switching regulator include but are not limited to SSL2108x LED illumination driver chip, which is available from NP Semiconductor N.V., Holland.

As shown in FIG. 7, an cathode of the switching diode D1 and an anode LED+ of the LED load are connected commonly to an output terminal of the bridge rectifying and filtering unit 431, an anode of the switching diode D1 is electrically connected to a drain pin of the switching regulator U4. The inductor L2 is electrically connected between an cathode LED− of the LED load and the drain pin of the switching regulator. Further referring to FIG. 7, the switching regulator U4 comprises a source pin S which is electrically connected to the control port of the PWM controller inside the chip and is electrically connected to the feedback unit 433 outside the chip. Moreover, in the circuit as shown in FIG. 7, a capacitor C7 is connected in parallel between the anode LED+ and the cathode LED− of the LED load to smooth operational voltage supplied with the LED load.

Referring to FIG. 7, the switching regulator U4 comprises a power supply pin VCC and an electrical grounding pin GND, wherein the power supply pin VCC is connected to the electrical grounding via a capacitor C4.

The feedback unit 433 comprises a resistor R6 which is electrically connected between the source S of the switching regulator U4 and the electrical grounding. As described with reference to FIG. 6, the voltage across the resistor R6 corresponds to the current flowing through the MOS transistor and the inductor L2. Thus, this voltage can be used as an feedback signal applied to the source S of the switching regulator U4 so that the PWM controller incorporated in the switching regulator U4 can ensure constant current by controlling the peak current for the MOS transistor. The operational process of the driving power supply as shown in FIG. 7 is similar to that of the power supply as shown in FIG. 6 and thus will not be described.

Alternatively, one or more other functional circuits, e.g., dimming circuit, sensing circuit, intelligent illumination control circuit and protective circuit, can be incorporated in the LED driving circuit as shown in FIGS. 4-7. These circuits and driving controller can be incorporated in the same semiconductor die or chip; or these circuits can be provided in form of individual semiconductor die or chip; or some all of there circuits can be combined together in form of individual semiconductor die or chip.

Figure 8:
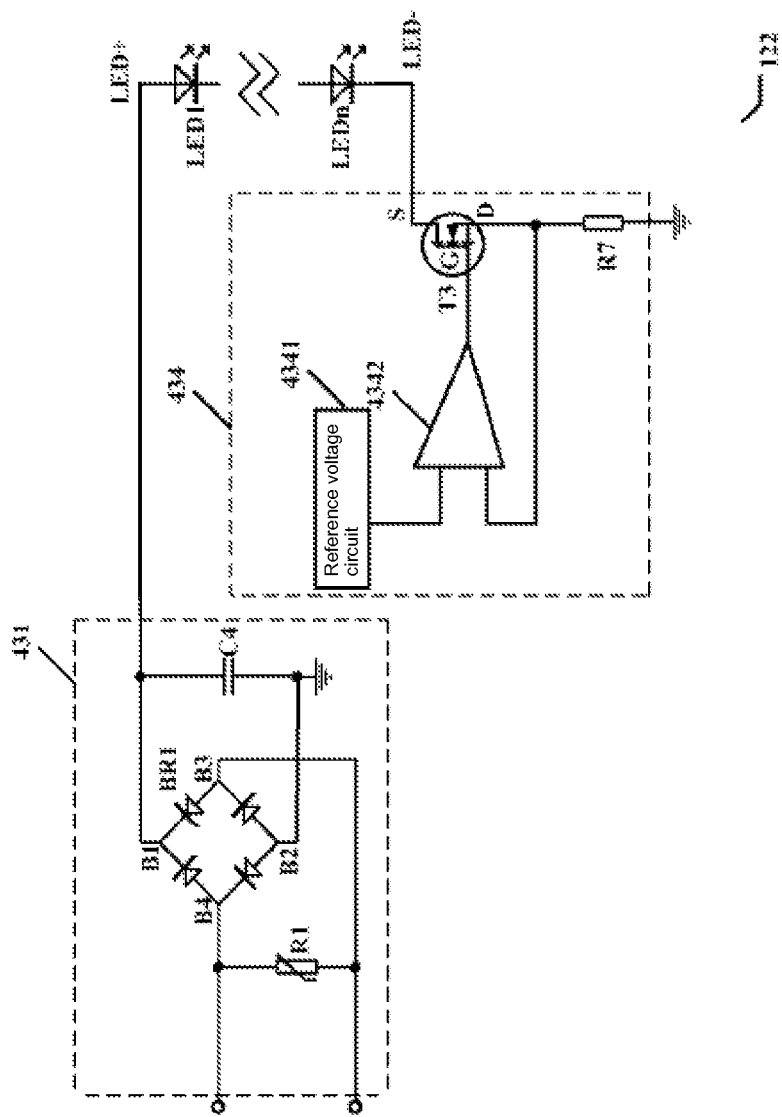
FIG. 8 is a schematic diagram illustrating another LED driving circuit applicable in the lamp holders as shown in FIGS. 1A, 1B, 2, 3A and 3B.

FIG. 8 is a schematic diagram illustrating another LED driving circuit applicable in the lamp holders as shown in FIGS. 1A, 1B, 2, 3A and 3B.

The LED driving circuit 122 as shown in FIG. 8 comprises a bridge rectifying and filtering unit 431 and a linear constant current unit 434, which are further described hereinafter.

As shown in FIG. 8, the bridge rectifying and filtering unit 431 comprises a full bridge rectifier BR1, a capacitor C4 and a voltage dependent resistor R1. Alternative current power, e.g., available from city power grid, is rectified by the full bridge rectifier BR1 and supplied in form of full wave pulse voltage at a positive terminal B1. The voltage dependent resistor R1 are connected in parallel between AC input terminals B3 and B4 of the full bridge rectifier BR1, wherein the voltage dependent resistor R1 clamps the input voltage for the full bridge rectifier BR1 at a predetermined level by suppressing abnormal voltage in the circuit. The filtering capacitor C4 is electrically connected between a positive terminal B1 and a negative terminal B2 of the full bridge rectifier BR1 so as to lowpass filter pulse voltage output from the full bridge rectifier BR1. The negative terminal B2 is connected to the electrical grounding.

It should be noted that although full wave rectification is used herein, half wave rectification is also applicable. Furthermore, the voltage dependent resistor R1 and the filtering capacitor C4 in the bridge rectifying and filtering unit 431 as shown in FIG. 8 can be removed to simplify circuit structure.

The linear constant current unit 434 comprises a reference voltage circuit 4341, an error amplifier 4342, a MOS transistor T3 and a resistor R7. Referring to FIG. 8, an anode LED+ of the LED load LED1-LEDn (assuming that they are connected in series hereinafter) is electrically connected to the positive terminal B1, and a cathode LED− is electrically connected to a source S of the MOS transistor T3 in the linear constant current unit 434. A drain D of the MOS transistor T3 is electrically connected to the electrical grounding via the resistor R7 and its gate is electrically connected to an output of the error amplifier 4342. The reference voltage output from the reference voltage circuit 4341 is applied to one of input terminals of the error amplifier. The drain D of the MOS transistor T3 is electrically connected to the resistor R7 and electrically connected to another input terminal of the error amplifier 4342 so as to provide a sampling signal on the resistor R7 to the another input terminal. During operation, the difference between two signals applied to the two input terminals of the error amplifier 4342 is amplified and then used for controlling a voltage at the gate of the MOS transistor T3 so as to make the current flowing through the LED load constant.

Preferably, the reference voltage circuit, the error amplifier and the MOS transistor can be incorporated in the same integrated circuit chip. The examples of the above integrated circuit chip include but are not limited to IC chip CW11L01 which is available from Shanghai Chipswinner electronics Ltd., China.

It should be noted that although in the LED driving circuits as described above, the LED components are connected in series, these LED driving circuits is applicable to parallel connection, parallel-serial connection and intersection array connection.

Certain aspects of the inventive concept have mainly been described above with reference to a few embodiments. However, as is readily appreciated by a person skilled in the art, embodiments other than the ones disclosed above are equally possible and within the scope of the inventive concept. Similarly, while a number of different combinations have been discussed, all possible combinations have not been disclosed. One skilled in the art would appreciate that other combinations exist and are within the scope of the inventive concept. Moreover, as is understood by the skilled person, the herein disclosed embodiments are as such applicable also to other standards and communication systems and any feature from a particular figure disclosed in connection with other features may be applicable to any other figure and or combined with different features.

What is claimed is:

1. A lamp holder, comprising:
   a housing, including:
      a base made of insulation material;
      a side wall fixed with the base, at least a part of which is made of conductive material;
      an electrical contact member fixed at the bottom of the base; and
   a LED driving power supply, including:
      a baseplate being fixed in a space defined by the base and the side wall;
      a LED driving circuit arranged on the baseplate;
      a first input electrode and a second input electrode arranged on the baseplate and electrically connected to the side wall and the electrical contact member;
      wherein on a side of the baseplate, a conductive area is formed to contact with the side wall so as to act as the first input electrode, and the second input electrode is in the form of wire.

2. The lamp holder according to claim 1, wherein the first and second input electrodes are in the form of wire.

3. The lamp holder according to claim 1, wherein the LED driving circuit comprises:
   an AC/DC converting unit;
   a switched-mode DC/DC converter coupled to the AC/DC converting unit.

4. The lamp holder according to claim 3, wherein the switched-mode DC/DC converter comprises:
   a DC-DC boost converting unit, comprising an inductor, a switching diode, a PWM controller and a MOS transistor, wherein the inductor and the switching diode are connected in series between the AC/DC converting unit and a positive output terminal, a drain of the MOS transistor is electrically connected between the inductor and an anode of the switching diode, a gate of the MOS transistor is electrically connected to an output port of the PWM controller; and
   a feedback unit, comprising a transistor with a base terminal electrically connected to a negative output terminal and a collector terminal electrically connected to a control port of the PWM controller.

5. The lamp holder according to claim 4, wherein the switched-mode DC/DC converter further comprises a capacitor electrically connected between the control port of the PWM controller and an electrical grounding an AC/DC converting unit.

6. The lamp holder according to claim 3, wherein the switched-mode DC/DC converter comprises:
   a DC-DC buck converting unit, comprising an inductor, a switching diode, a PWM controller and a MOS transistor, wherein a cathode of the switching diode and a positive output terminal are commonly connected to an input terminal of the AC/DC converting unit, a drain of the MOS transistor is electrically connected to an anode of the switching diode, a gate of the MOS transistor is electrically connected to an output port of the PWM controller, and the inductor is electrically connected between the drain of the MOS transistor and a negative output terminal; and a feedback unit, comprising a resistor connected to both of a source of the MOS transistor and a control port of the PWM controller.

7. The lamp holder according to claim 6, wherein the switched-mode DC/DC converter further comprises a capacitor electrically connected between the positive output terminal and the negative output terminal.

8. The lamp holder according to claim 6, wherein the PWM controller and the MOS transistor are integrated into the same IC.

9. The lamp holder according to claim 1, wherein the LED driving circuit comprises:

an AC/DC converting unit;

a linear constant current coupled to the AC/DC converting unit.

\* \* \* \* \*